United States Patent [19]

Matsuuchi

[11] Patent Number: 5,032,874
[45] Date of Patent: Jul. 16, 1991

[54] IMAGE FORMING APPARATUS HAVING A SYSTEM FOR PREVENTING OVERHEATING OF THE HEAT ROLLERS

[75] Inventor: Yasuyuki Matsuuchi, Osaka, Japan
[73] Assignee: Minolta Camera Kabushiki Kaisha, Osaka, Japan
[21] Appl. No.: 434,559
[22] Filed: Nov. 13, 1989

Related U.S. Application Data

[63] Continuation of Ser. No. 357,669, May 26, 1989, abandoned, which is a continuation of Ser. No. 151,094, Feb. 1, 1988, abandoned.

[30] Foreign Application Priority Data

Jan. 30, 1987 [JP] Japan .................. 62-21586

[51] Int. Cl.⁵ .......................................... G03G 15/20
[52] U.S. Cl. ..................................... 355/285; 219/216
[58] Field of Search ............... 355/285, 289, 295, 282; 219/216, 388, 412, 413; 430/60

[56] References Cited

U.S. PATENT DOCUMENTS

| | | | |
|---|---|---|---|
| 3,936,658 | 2/1976 | Traister et al. | 219/216 |
| 4,113,375 | 9/1978 | Murata et al. | 355/14 FU |
| 4,385,826 | 5/1983 | Itoh | 355/14 FU |
| 4,538,902 | 9/1985 | Inuzuka et al. | 355/14 FU |
| 4,551,007 | 11/1985 | Elter | 355/14 FU |
| 4,556,779 | 12/1985 | Hashimoto et al. | 355/3 FU |
| 4,603,245 | 7/1986 | Yagasaki | 219/216 |
| 4,618,247 | 10/1986 | Tsuji | 355/3 FU |
| 4,642,448 | 2/1987 | Shigemura et al. | 219/216 |
| 4,684,784 | 8/1987 | Tamary | 355/14 FU |

FOREIGN PATENT DOCUMENTS 56-161558 12/1981 Japan .
61-102675 5/1986 Japan .

Primary Examiner—R. L. Moses
Attorney, Agent, or Firm—Wenderoth, Lind & Ponack

[57] ABSTRACT

An image forming apparatus includes a pair of fixing rollers having a heater, a heater controller for outputting a turn-on/off signal to the heater, a sensor for detecting a turn-on/off state of the heater, a generator for generating a signal during an image forming operation and a prohibiting controller for cutting off a power supply to the heater when the signals from the heater controller, the sensor and the generator are simultaneously supplied.

24 Claims, 4 Drawing Sheets

IMAGE FORMING APPARATUS HAVING A SYSTEM FOR PREVENTING OVERHEATING OF THE HEAT ROLLERS

This application is a continuation of application Ser. No. 357,669, filed on May 26, 1989, which is a continuation of application Ser. No. 151,094, filed Feb. 1, 1988.

BACKGROUND OF THE INVENTION

1. Field of the Invention

The present invention relates to an image forming apparatus having a fixing device for fixing an image which includes a pair of rollers and a heater is housed in at least one of the rollers.

2. Description of the Prior Art

Conventionally the so called heat roller system is widely used as a fixing device for an imaging apparatus such as an electro-photographic printer or copy machine. In this system, a heater is installed as a heat source in at least one of two rollers. A toner image is fixed thermally when a copy paper passes between the two rollers. The heater is automatically controlled so as to maintain a temperature or a range of temperatures of the roller desirable for fixing a toner image.

In order to control the heater, there are usually provided a thermister for detecting a temperature of the surface of the heat roller, a bridge circuit such as a Wheatstone bridge circuit including the thermister as an element thereof and a comparator for comparing an output of the bridge circuit with a predetermined value or a microcomputer for processing an output of the bridge circuit (See, for example, JP-A 53-65743 and JP-A 60-115977).

However, in this temperature control, the heater may improperly turn on if a power supply circuit is damaged or the temperature controller becomes uncontrollable. Once the heater is improperly turned on, the heat-roller is overheated so as to cause thermal damage of the heat-roller or parts arranged therearound and, furthermore, a fire may occur due to a burning of a copy paper inserted between the pair of rollers.

Conventionally, a thermo-sensitive braker such as a thermal fuse is arranged near the surface of the heat-roller and when the heat roller is overheated, the power supply to the heater is automatically cut off. However, the sensitivity of the thermo-sensitive braker is relatively low in general and, therefore, it is difficult to prevent thermal damage of the heat-roller since the operation temperature thereof is set at a temperature which is higher than the upper limit of the desirable temperature range by a proper temperature.

In order to solve the problem mentioned above a means for preventing the improper turning on of the heater has been proposed conventionally. However, according to the conventional system, the thermister for detecting the surface temperature of the heat roller is used as means for detecting the improper turning-on of the heater and it is presumed a priori that the thermister always operates normally (if the system is controlled by a control program, the control program is presumed to be performing normally). Accordingly, the protection system is inoperative in the case that the thermister is defective and/or the control program is not performing normally. As causes which invite the inoperability of the thermister, adhesion of toner and/or paper dust to the surface of the thermister and fricative waste thereof by the surface of the heat roller are considered.

Furthermore, the microcomputer for controlling the system may become uncontrollable due to noise caused when individual imaging units are actuated and/or a lighting surge. As is apparent from the above, these usually happen during a copying operation. In other words, the possibility of overheating of the heat-roller during the copying operation is considered to be higher than that in the waiting state of the machine.

SUMMARY OF THE INVENTION

An essential object of the present invention is to provide an image forming apparatus capable of preventing an improper turning-on of the heater irrespective of inoperability of a thermister used for detecting a surface temperature of a fixing roller.

Another object of the present invention is to provide an image forming apparatus having means capable of detecting an improper turning on of the heater during an image forming operation.

In order to accomplish these objects, according to the present invention, there is presented an image forming apparatus having a fixing device for fixing a toner image on a paper using a pair of heat rollers at least one of which having a heater therein, said image forming apparatus comprising: a heater control means for outputting a turn-on/off signal to the heater in order to control a temperature of the fixing device; a detection means for outputting a signal when it is detected that the heater is turned on; a first signal generating means for outputting a signal during an image forming operation; a second signal generating means for outputting a signal after a predetermined time interval from the time that the signals from the heater control means, the detection means and the first signal generating means are all simultaneously input thereto, and a power supply control means for cutting off a power supply to the heater when the signal is outputted by a second signal generating means.

Namely, according to the present invention, if the heater is turned on for an usually long time in an image forming operation, the second signal generating means outputs a signal and the power supply control means cuts off the power supply to the heater forcibly when said signal is outputted from the second signal generating means.

BRIEF DESCRIPTION OF DRAWINGS

These and other objects and features of the present invention will become more apparent when the preferred embodiment of the present invention is described in detail with reference to the drawings in which.

DESCRIPTION OF THE PREFERRED EMBODIMENT

Figure 1:
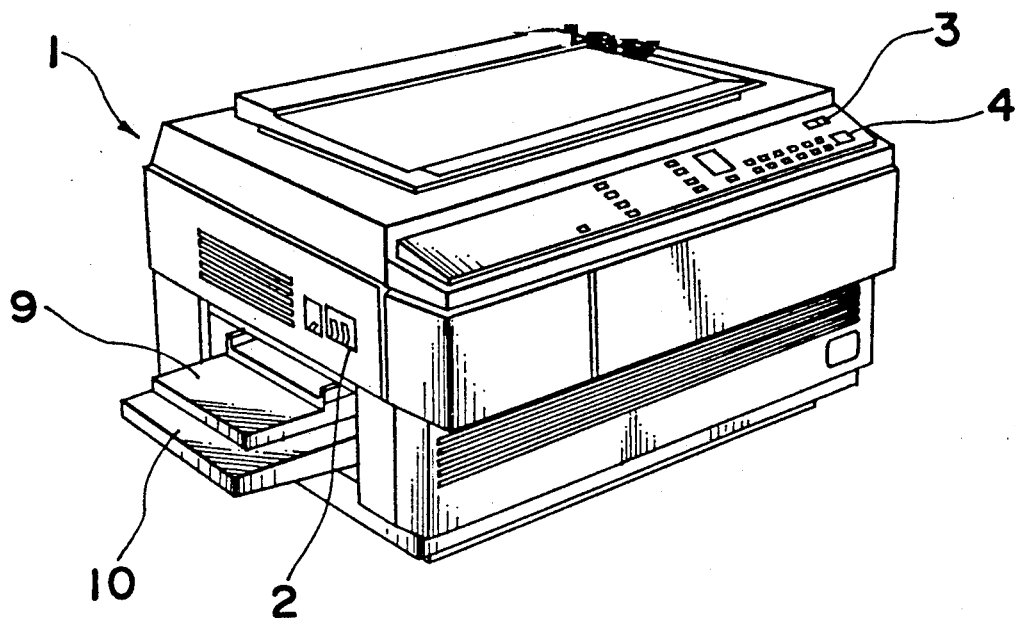
FIG. 1 is a perspective view of a copy machine to which the present invention is applied.

FIG. 1 shows a perspective view of a copy machine used as an image forming apparatus according to the present invention.

The copy machine 1 provides a main switch 2 as a power switch on a side wall of a main body thereof. When the main switch 2 is switched on, an electric power of a predetermined voltage is supplied to the copy machine 1. A display 3 for indicating the number of copies is arranged on an operation panel which is provided on a front portion of an upper wall of the main body. This display 3 is used for indicating a trouble code corresponding to a trouble when it occurs in the copy machine.

Any operation of a print key 4 arranged on the operation panel is not accepted until a thermal fixing device is warmed up to a predetermined temperature after switching on the main switch 2. If a trouble occurs in the thermal fixing device, it is indicated by the display 3. If no trouble occurs for a predetermined time period for warming up the fixing device, an indicator for indicating an operable state of the copy machine is turned on and, when the print key 4 is pushed down, a copy operation is started.

Figure 2:
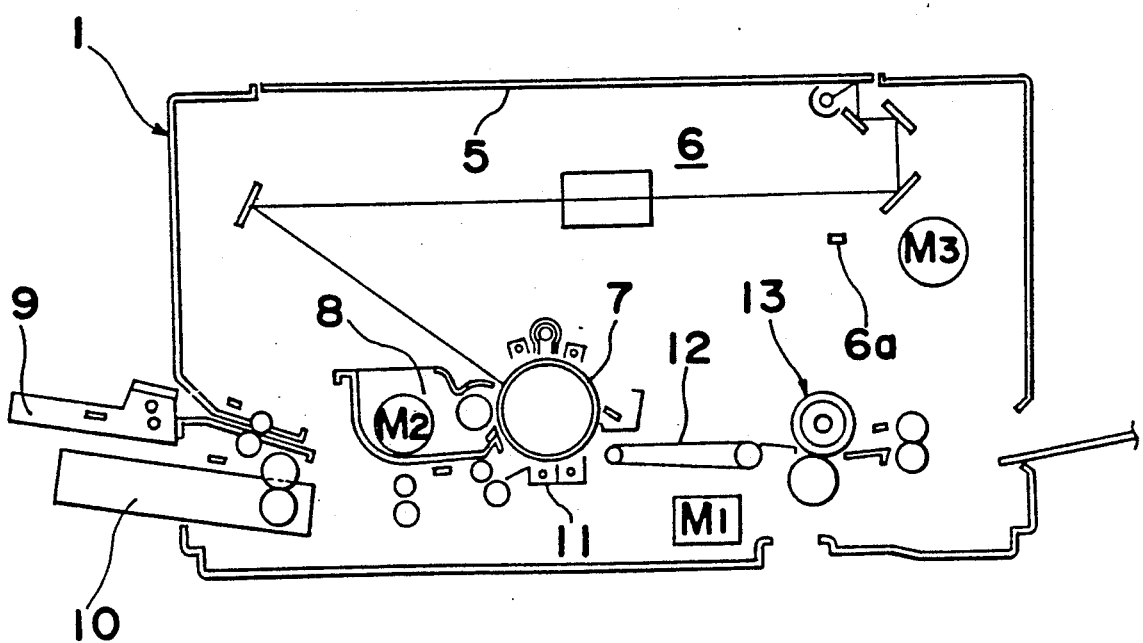
FIG. 2 is a schematical sectional view of the copy machine.

FIG. 2 shows a schematic cross-sectional view of the copy machine.

As is shown in FIG. 2, the copy machine 1 provides a scanning optical system 6 for scanning optically a document put on a document platen 5, a photo-conductive drum 7 for forming a latent image of the document when the image of the document is exposed thereon by the scanning optical system 6. The latent image is developed into a toner image by a developer 8 and, then, the toner image is transferred onto a copy paper sent from either one of cassettes 9 and 10 by a transferring charger 11. The copy paper on which the toner image is transferred is sent by a conveyor belt 11 to a thermal fixing device 13 for fixing the toner image thermally. Since the electro-photographic copy system is well known to those skilled in the art, a detailed description of the copy machine itself will be abbreviated.

Figure 3:
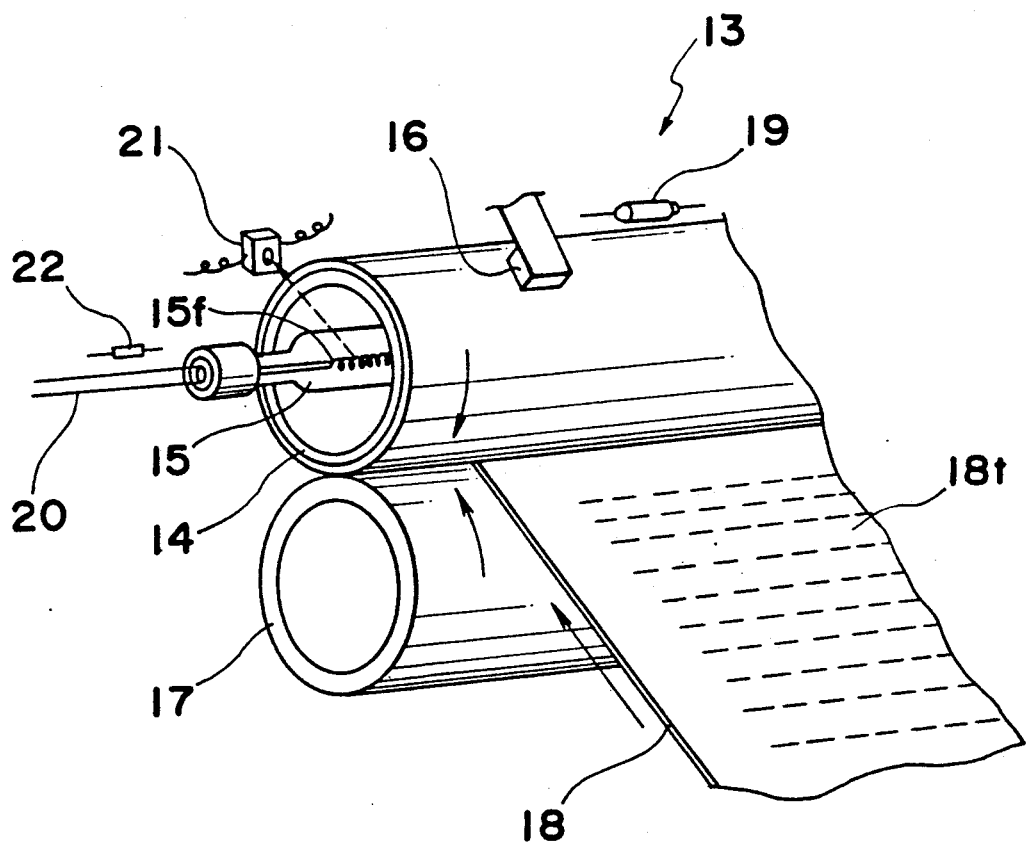
FIG. 3 is a perspective view of an essential portion of a fixing device according to the present invention.

FIG. 3 shows the thermal fixing device 13 according to the present invention.

The thermal fixing device 13 is substantially comprised of a hollow heat roller 14 into which a heat lamp 15 is inserted coaxially and a press roller 17 for pressing a copy paper 18 to the heat roller 14. In order to detect a temperature of the outer surface of the heat roller 14, a thermister 16 supported by a proper support element is arranged so as to be in contact with the outer surface thereof or very near to the latter. When the temperature detected by the thermister 16 is raised up to a predetermined value, the heat roller 14 and the press roller 17 are allowed to rotate by a controller which will be explained later. The copy paper 18 is sent by the rotations of rollers 14 and 17 and a toner image 18t formed on the copy paper 18 is fixed thermally by contacting the surface of the heat roller 14.

As is well known to those skilled in the art a nonadhesive material is coated on the surface of the heat roller 14.

A thermal fuse 19 is also arranged near the surface of the heat roller 14. This thermal fuse 19 is connected serially to the heat lamp 15 and it operates to cut off the power supply to the heat lamp 15 when the surface temperature of the heat roller 14 is raised up to a predetermined dangerous temperature.

Furthermore, an infrared ray sensor 21 is arranged so as to be able to detect infrared rays emitted from the heat lamp 15. This infrared ray sensor 21 is provided for detecting an irregular turning on of the heat lamp 15 directly but, in place of it, a magnetic sensor 22 can be used for the same purpose. In the latter case, the magnetic sensor 22 is arranged near a power supply line 20 in order to detect changes in a magnetic field caused by changes of an electric current flowing therethrough.

Figure 4:
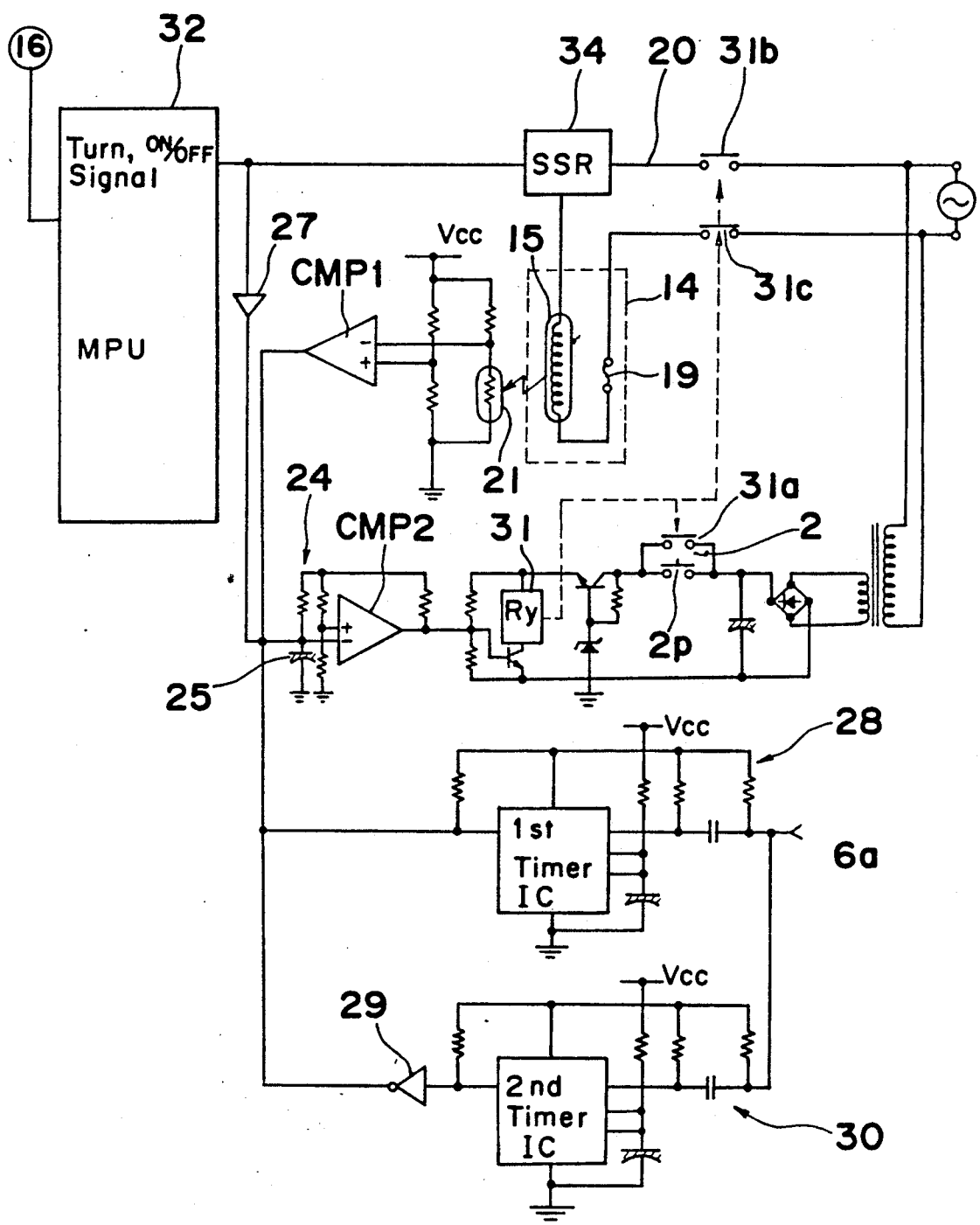
FIG. 4 is a block diagram of a heater control circuit according to the present invention.

FIG. 4 shows a heat control circuit for controlling the temperature of the heat roller 14 and for detecting the overheating thereof.

When the main switch 2 (see FIG. 1) is switched on, a contact 2p thereof is closed. When the contact 2p is closed a relay 31 is energized and, a relay contact 31a is thereby closed, so as to hold the relay 31 in the energized state. The contact 31a is connected in parallel with the contact 2p. Also, two relay contacts 31b and 31c connected in the power supply line 20 are closed at the same time. Accordingly, power may be supplied to the heat lamp 15.

A micro-processing unit (MPU) 32 is provided for outputting a turn-on signal according to an output signal from the thermister 16. When a turn-on signal is outputted from the MPU 32, a solid state relay (SSR) 34 is operated to turn on the heat lamp 15. The MPU 321 outputs a turn-on signal of a "high" level when the surface temperature of the heat roller 14 is detected to be lower than a predetermined temperature by the thermister 16, and, when the surface temperature becomes higher than the latter, the MPU 32 outputs a turn off signal of a "low" level.

It is to be noted that a switching from a turn on signal to a turn off signal or vice versa is prohibited during lighting of an exposure lamp of the scanning optical system in the order to prevent a possible change in light intensity thereof during the scanning operation.

Next, a circuit for detecting an irregular overheat of the heat lamp 15 is explained.

A light emitted by the heat lamp 15 is detected by the infrared ray sensor 21. A comparator CMP 1 compares a detection signal from the infrared ray sensor 21 with a predetermined voltage and outputs a signal of a "high" level to an integral circuit 24 as long as the heat lamp 15 is turned on.

Also, a turn-on signal outputted from the MPU 32 is also inputted, via a buffer 27, to the integrator circuit 24. Furthermore, a composite signal S, consisting of an output signal from the first timer circuit 28 and an output signal from the second timer circuit 30 after being inverted by an inverter 29 is inputted to the integrator circuit 24.

In the preferred embodiment, devices of open collector type are used as the comparator CMP 1, the buffer 27, the first timer circuit 28 and the inverter 29, respectively.

The first timer circuit 28 is provided for outputting a signal of a "high" level indicating that the copy machine is operating in the copy mode. This signal is outputted from a time when a switch 6a provided in the scanning optical system is switched on at a start time of a scanning operation until the copy operation is finished, as is shown in (D) of FIG. 5.

The second timer circuit 30 is provided for prohibiting the detection of irregular overheating as long as the exposure lamp of the scanning system is turned on. It outputs a signal of a "high" level from the time of the switching-on of the exposure lamp until the latter is turned off, as is shown in (E) of FIG. 5.

Figure 5:
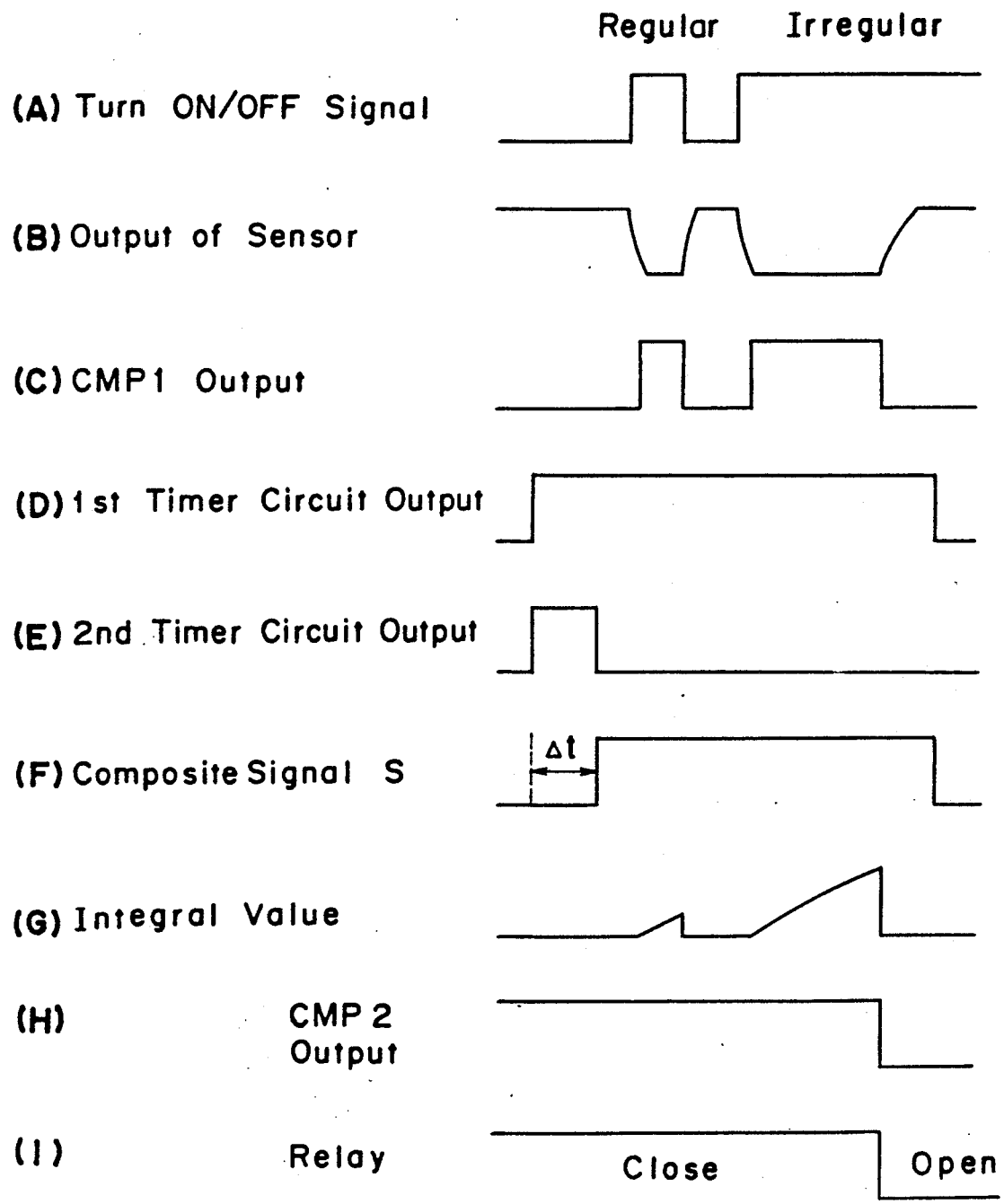
FIG. 5 is a time chart of individual devices provided in the heater control circuit.

Accordingly, as is shown in (F) of FIG. 5, the composite signal S becomes a "high" level after a time interval $\Delta t$, which is determined by the second timer circuit 30, has passed from the switching-on of the switch 6a in the scanning system.

The integrator circuit 24 has a capacitor 25 for integration. This capacitor 25 is charged only when all of the three signals input thereto are high at the same time. The output terminal of the integrator circuit 24 is connected to one of the input terminals of a comparator CMP 2. This comparator CMP 2 is set so as to invert an output thereof to a "low" level when an integrated signal of the integrator circuit 24 exceeds a predetermined threshold value set at the other input terminal thereof after the start of charging.

When the comparator CMP 2 output is inverted, the relay 31 for supplying a power to the heat lamp 15 is forcibly operated to open both of the contacts 31b and 31c, as is clearly understood from (H) and (I) of FIG. 5. Namely, the power for energizing the heat lamp 15 is cut off forcibly. This prevents an overheating of the heat roller 14. Although the output from the buffer 27 is varied independently from the copying operation of the copy machine, the integration operation by the integrator circuit 24 is prohibited until the infrared ray sensor 21 detects a turning-on of the heat lamp 15 and until a predetermined time interval Wt has been passed after the second timer circuit 30 is started by the switch 6a. In other words, the integration operation is started only when the heat lamp 15 is kept turned on and the second timer circuit 30 is inverted from a "high" level to "low" level.

As long as the heat control circuit for the heat roller 14 operates normally, the capacitor 25 of the integrator circuit 24 is discharged before the integrated value becomes higher than the threshold value set at the comparator CMP 2, as is shown at the middle portion of (G) of FIG. 5. Therefore, the relay 31 is not operated to open. This guarantees the normal control of the heat lamp 15.

On the contrary, if a turn-on signal of the heat lamp 15 occurs for an unusually long time, the integrated value by the integrator circuit 24 is increased to a level which causes an inversion of the comparator CMP 2 output. It is to be noted that the threshold value of the comparator CMP 2 is determined so as not to cause any damage of the heat roller 14. Accordingly, the overheating of the heat roller 14 is surely prevented.

Although the switching of the turn-on/off signal for the heat lamp 5 is prohibited as long as the exposure lamp is turned on in the preferred embodiment, the present invention is not limited thereto. For instance, it is possible to use an internal clock provided in the MPU 32. In this case, when an operation signal of the switch 6a is input to the MPU 32, the internal clock counts a predetermined time interval which corresponds to a time interval during which the scanning system is operated. In the case that the internal timer is used, it is desirable to alter a set time of the second timer IC of the second timer circuit 30 so as to match with the time interval for the internal clock.

Furthermore, the second timer circuit 30 and the inverter 29 can be omitted since it is not necessary to prohibit the detection of the overheating of the heat roller when the present invention is applied to a copy machine not having a prohibition means for prohibiting the switching of the turn-on/off signal during the lighting of the exposure lamp.

The preferred embodiments described herein are illustrative and not restrictive, the scope of the invention being indicated by the appended claims and all variations which come within the meanings of the claims are intended to be embraced herein.

What is claimed is:

1. In an image forming apparatus having a fixing device for fixing a toner image on a paper using a pair of heat rollers at least one of which having a heater therein, said image forming apparatus comprising:
    a heater control means for outputting a turn-on/off signal to the heater in order to control a temperature of the fixing device;
    a detection means for outputting a signal when it is detected that the heater is turned on,
    a first signal generating means for outputting a signal during an image forming operation,
    a second signal generating means for outputting a signal after a predetermined time interval from a time that the signals from the heater control means, the detection means and the first signal generating means are all simultaneously input thereto, and
    a power supply control means for cutting off a power supply to the heater when the signal is outputted by the second signal generating means.

2. An image forming apparatus according to claim 1, wherein the first signal generating means is comprised of a detection means for detecting a start of an image forming operation and a timer means for outputting a signal for a predetermined time interval after the start of an image forming operation has been detected.

3. An image forming apparatus according to claim 1, further comprising a means for delaying a signal generated by the first signal generating means.

4. An image forming apparatus according to claim 1, wherein the detection means is comprised of a photosensor.

5. An image forming apparatus according to claim 1, wherein said second signal generating means includes: a capacitor which is charged to a charge voltage when signals from said heater control means and said detection means and said first signal generating means are all simultaneously input, and a comparator for outputting a signal to said power supply control means when an integrated value of said charge voltage on said capacitor exceeds a predetermined value.

6. An image forming apparatus comprising:
    a first detection means for detecting a surface temperature of a pair of rollers provided for fixing a toner image on a paper at least one of which having a heater therein;
    a heater control means for outputting a turn on/off signal for turning the heater on or off according to the surface temperature detected by the detection means;
    a second detection means for outputting a signal when it is detected that the heater is turned on;
    a first signal generating means for outputting a signal during an image forming operation;
    a second signal generating means for outputting a signal after a predetermined time interval from a time that it simultaneously receives the signals from the heater control means, the second detection means and the first signal generating means, and
    a power supply control means for cutting off a power supply to the heater when the signal is outputted by the second signal generating means.

7. An image forming apparatus according to claim 6, wherein said first signal generating means comprises a detection means for detecting a start of an image forming operation and a timer means for outputting a signal for a predetermined time interval after the start of an image forming operation has been detected.

8. An image forming apparatus according to claim 6, further comprising a means for delaying a signal generated by said first signal generating means.

9. An image forming apparatus according to claim 6, wherein said detection means comprises a photo-sensor.

10. An image forming apparatus according to claim 6, wherein said second signal generating means includes: a capacitor which is charged to a charge voltage when signals from said heater control means and said detection means and said first signal generating means are all simultaneously input, and a comparator for outputting a signal to said power supply control means when an integrated value of said charge voltage on said capacitor exceeds a predetermined value.

11. An image forming apparatus comprising:
a photosensitive member having a photosensitive layer on a cylindrical surface thereof which is rotatable about a central axis thereof;
a means for charging the photo-conductive body;
a means for forming a latent image on the photosensitive;
a means for transferring a toner image formed on the photo-conductive body by a developing means onto a paper;
a means for fixing the toner image on a paper using a pair of heating rollers at least one of which includes a heater therein;
a means for detecting a surface temperature of one of the pair of heating rollers;
a heater control means for outputting a turn-on/off signal to the heater according to an output from the detecting means;
a means for detecting a turn-on of the heater and for outputting a signal when the turn-on is detected;
a means for detecting a start of an operation of the latent image forming means;
a first signal generating means for outputting a signal for a predetermined time interval after detection of the start of an operation of the latent image forming means;
a second signal generating means for outputting a signal after a predetermined time interval from a time when the signals from the heater control means, the detection means for detecting a turn-on of the heater and the first signal generating means simultaneously occur, and
a power supply control means for cutting off a power supply to the heater when the signal is outputted by the second signal generating means.

12. An image forming apparatus according to claim 1, wherein the latent image forming means is comprised of a document platen for setting a document thereon and a scanning means for exposing a document image on the photosensitive member.

13. An image forming apparatus according to claim 11, wherein said first signal generating means comprises a detection means for detecting a start of an image forming operation and a timer means for outputting a signal for a predetermined time interval after the start of an image forming operation has been detected.

14. An image forming apparatus according to claim 11, further comprising a means for delaying a signal generated by said first signal generating means.

15. An image forming apparatus according to claim 11, wherein said detection means comprises a photo-sensor.

16. An image forming apparatus according to claim 11, wherein said second signal generating means includes: a capacitor which is charged to a charge voltage when signals from said heater control means and said detection means and said first signal generating means are all simultaneously input, and a comparator for cutting a signal to said power supply control means when an integrated value of said charge voltage on said capacitor exceeds a predetermined value.

17. An image forming apparatus having a fixing device for fixing a toner image on a paper using a pair of heat rollers at least one of which having a heater therein, said image forming apparatus comprising:
a heater control means for outputting a turn-on/off signal to the heater in order to control a temperature of the fixing device;
a detection means for outputting a signal when it is detected that the heater is actually turned on;
a first signal generating means for outputting a signal during an image forming operation;
a second signal generating means for outputting a signal after a predetermined time interval from a time that signals from said detection means and said first signal generating means are both simultaneously input thereto; and
a power supply control means for cutting off a power supply to the heater when said signal is outputted by said second signal generating means.

18. An image forming apparatus according to claim 17, wherein said first signal generating means comprises a detection means for detecting a start of an image forming operation and a timer means for outputting a signal for a predetermined time interval after the start of an image forming operation has been detected.

19. An image forming apparatus according to claim 17, further comprising a means for delaying a signal generated by said first signal generating means.

20. An image forming apparatus according to claim 17, wherein said detection means comprises a photo-sensor.

21. An image forming apparatus according to claim 17, wherein said second signal generating means includes: a capacitor which is charged to a charge voltage when signals from said detection means and said first signal generating means are both simultaneously input thereto, and a comparator for outputting a signal to said power supply control means when an integrated value of said charge voltage on said capacitor exceeds a predetermined value.

22. An image forming apparatus having a fixing device for fixing a toner image on a paper using a pair of heat rollers at least one of which having a heater therein, said image forming apparatus comprising:
a heater control means for outputting a turn-on/off signal to the heater in order to control a temperature of the fixing device;
a determining means for determining whether or not the heater is turned on and for outputting a signal when it is determined that the heater is actually turned on;
a first signal generating means for outputting a signal during an image forming operation;
a second signal generating means for outputting a signal after a predetermined time interval from a time that signals from said determining means and said first signal generating means are both simultaneously input thereto; and a power supply control means for cutting off a power supply to the heater when a signal is outputted by said second signal generating means.

23. An image forming apparatus according to claim 22, wherein said determining means includes a sensor for detecting the condition of the heater and wherein said determining means makes its determination based on at least an output from said sensor.

24. An image forming apparatus according to claim 23, wherein said determining means makes its determination based on an output from said sensor and said turn-on/off signal from said heater control means.

* * * * *